United States Patent
Jablonski et al.

(10) Patent No.: US 7,256,517 B2
(45) Date of Patent: Aug. 14, 2007

(54) INTERFACE CIRCUIT FOR PROVIDING A COMPUTER LOGIC CIRCUIT WITH FIRST AND SECOND VOLTAGES AND AN ASSOCIATED METHOD

(75) Inventors: Charles Clark Jablonski, Monticello, GA (US); Stephen Scott Piper, McDonough, GA (US); Sukha R. Ghosh, Lilburn, GA (US)

(73) Assignee: LSI Corporation, Milpitas, CA (US)

( * ) Notice: Subject to any disclaimer, the term of this patent is extended or adjusted under 35 U.S.C. 154(b) by 1296 days.

(21) Appl. No.: 09/938,081

(22) Filed: Aug. 23, 2001

(65) Prior Publication Data

US 2004/0178682 A1    Sep. 16, 2004

Related U.S. Application Data

(60) Provisional application No. 60/227,237, filed on Aug. 23, 2000.

(51) Int. Cl.
*H02J 1/00* (2006.01)
*H02J 3/00* (2006.01)

(52) U.S. Cl. ..................................... 307/75
(58) Field of Classification Search ............... 307/75, 307/52
See application file for complete search history.

(56) References Cited

U.S. PATENT DOCUMENTS

| 5,406,140 | A | | 4/1995 | Wert et al. |
| 5,490,117 | A | | 2/1996 | Oda et al. |
| 5,514,951 | A | * | 5/1996 | Halim et al. ................. 323/281 |
| 5,534,801 | A | | 7/1996 | Wu et al. |
| 5,592,394 | A | | 1/1997 | Wiscombe |
| 5,613,130 | A | | 3/1997 | Teng et al. |
| 5,689,202 | A | | 11/1997 | Ranson |
| 5,739,596 | A | * | 4/1998 | Takizawa et al. ............. 307/66 |
| 5,825,166 | A | | 10/1998 | Tso et al. |
| 5,828,892 | A | | 10/1998 | Mizuta |
| 5,977,755 | A | | 11/1999 | Miki et al. |
| 6,091,617 | A | | 7/2000 | Moran |
| 6,327,635 | B1 | * | 12/2001 | Alston et al. ................ 710/301 |

* cited by examiner

*Primary Examiner*—Brian Sircus
*Assistant Examiner*—Carlos Amaya
(74) *Attorney, Agent, or Firm*—Yee & Associates

(57) ABSTRACT

A universal interface circuit and an associated method are provided that can supply a computer logic circuit, such as the components mounted upon an adapter card, with first and second inputs having first and second predetermined voltage levels, respectively, based upon power drawn from both first and second supply voltages. The interface circuit typically includes a first power supply circuit for providing the first input having the first predetermined voltage level in response to the first supply voltage. Additionally, the interface surface includes a regulator for generating an output having the second predetermined voltage level in response to the first supply voltage. The interface circuit further includes a second power supply circuit for providing an output that also has the second predetermined voltage level, albeit in response to the second supply voltage. In order to divide the anticipated load between the first and second supply voltages, the regulator and the second power supply circuit cooperate to provide the second input having the second predetermined voltage level in instances in which the second supply voltage is present. The interface circuit provides for the universal operation of the computer logic circuit, however, in that the regulator will provide the second input having the second predetermined voltage level in a manner independent of the second power supply circuit in instances in which the second supply voltage is unavailable.

13 Claims, 3 Drawing Sheets

INTERFACE CIRCUIT FOR PROVIDING A COMPUTER LOGIC CIRCUIT WITH FIRST AND SECOND VOLTAGES AND AN ASSOCIATED METHOD

CROSS-REFERENCE TO RELATED APPLICATION

The present application claims priority from U.S. Provisional Patent Application No. 60/227,237, filed Aug. 23, 2000, entitled: INTERFACE CIRCUIT FOR PROVIDING A COMPUTER LOGIC CIRCUIT WITH FIRST AND SECOND VOLTAGES AND AN ASSOCIATED METHOD, the contents of which are incorporated herein by reference.

FIELD OF THE INVENTION

The present invention relates generally to interface circuits for computer logic circuits and, more particularly, to interface circuits for providing computer logic circuits, such as the logic circuits mounted upon adapter cards, with first and second voltages and associated methods.

BACKGROUND OF THE INVENTION

Digital circuitry has historically been powered at a 5 VDC level. Relatively recently, however, an alternative 3.3 VDC level has been adopted to power high density, high speed integrated circuits. As a result, two different digital systems generally exist, namely, a 5 volt system that only provides a 5 VDC supply voltage and a 3.3 volt system that provides both 3.3 VDC and 5 VDC supply voltages.

Each integrated circuit can therefore be designed in two different versions, one version of which would operate in a 5 volt system and another version of which would operate in a 3.3 volt system. As will be apparent, the manufacture of two versions of the same integrated circuit is disadvantageous since, among other things, the two versions would decrease the economies of scale typically associated with the mass production of an integrated circuit. Therefore, universal integrated circuits capable of operating in either a 3.3 volt system or a 5 volt system have been designed.

By way of example, personal computers, workstations, servers and the like commonly include a peripheral component interconnect (PCI) bus to provide a high-speed data path between the central processing unit and a number of peripheral devices connected to the PCI bus. These peripheral devices can include a display, a disk drive, a network controller and the like. In order to communicate via the PCI bus, a computer card, such as an adapter card and, more particularly, a modem card, a network controller card, a video card, a sound card or the like, is plugged into an expansion or adapter slot defined by the PCI bus. Upon being plugged into an expansion slot, the adapter card is connected, typically by means of an edge connector, with the address and data lines of the PCI bus. In addition, the adapter card is electrically connected to one or more power rails provided by the PCI bus that supply power to the components mounted upon the adapter card and to the associated peripheral devices. A PCI bus commonly includes a 5 volt power rail. In a 3.3 volt system, however, the PCI bus will include both a 5 volt power rail and a 3.3 volt power rail.

In instances in which the PCI bus has both 5 volt and 3.3 volt power rails, the adapter card can be provided with both 5 VDC and 3.3 VDC in a direct manner via the edge connector. Alternatively, the adapter card can include a regulator to convert a portion of the 5 volt supply voltage to 3.3 volts. As such, of the components of the adapter card that operate at a 3.3 VDC power level, a first predefined subset of the components are powered by the 3.3 volt supply voltage provided by the regulator, while a second predefined subset of the components are directly powered by the 3.3 volt power rail. While this adapter card can be readily plugged into a PCI bus having both 5 volt and 3.3 volt power rails, this adapter card is not universal since the adapter card cannot properly function if the adapter card is plugged into a PCI bus that only provides a 5 volt power rail. In this regard, while the regulator would continue to power the first predefined subset of components with 3.3 volts, the second predefined subset of components, that are designed to operate at a 3.3 volt power level and are otherwise directly powered by the 3.3 volt power rail, will go unpowered.

As will be apparent, it would be most advantageous for computer logic circuitry, such as the components mounted upon an adapter card, to be universal in that the computer logic circuit can operate in both a 5 volt system and a 3.3 volt system. In addition, it would be advantageous for computer logic circuitry to draw power from both the 5 volt power rail and the 3.3 volt power rail in instances in which both power rails are available in order to more evenly distribute the power loading.

In this regard, each power supply of a computer system can provide a predetermined maximum amount of power to the various adapter cards, peripheral devices and the like that are connected to a respective power rail. For example, a typical power supply of a computer system can provide up to 200 to 250 watts of power at 5 volts and 200 to 250 watts of power at 3.3 volts. While this maximum amount is generally sufficient, it may be exhausted, especially upon powering up, if the loads are not judiciously balanced. By way of example, in an attempt to be universal, an adapter card may be exclusively powered from the 5 volt power rail, even in a 3.3 volt system. For example, the components onboard the adapter card that operate at a 5 volt power level can be powered directly from the 5 volt power rail, while the components onboard the adapter card that operate at a 3.3 volt power level can be powered by a regulator that converts the 5 volt supply voltage to 3.3 VDC. While each adapter card is generally designed to draw no more than a predetermined maximum amount of power, such as 25 watts, the maximum power provided by the 5 volt power supply will be exhausted more quickly by powering all of the components of the adapter card from the 5 volt power rail than if the adapter cards were powered from both the 5 volt power supply and the 3.3 volt power supply. Accordingly, a system having a substantial number of adapter cards may be unable to be properly powered up since the collective power drawn from the 5 volt power rail by the plurality of adapter cards of this example may exceed the power rating of the 5 volt power supply.

SUMMARY OF THE INVENTION

A universal interface circuit and an associated method are therefore provided that can supply a computer logic circuit, such as the components mounted upon an adapter card, with first and second inputs having first and second predetermined voltage levels, respectively, such as 5 volts and 3.3 volts, based upon power drawn from both a first supply voltage, such as a 5 volt supply voltage, and a second supply voltage, such as a 3.3 volt supply voltage. By drawing power from both the first and second supply voltages in instances in which both supply voltages are present, neither power supply will be exhausted as quickly as in conventional designs in which a logic circuit is exclusively powered by a single supply voltage even in instances in which both the first and second supply voltages are present. Moreover, the interface circuit is universal and can therefore reliably supply the first and second inputs to the computer logic circuit both in instances in which the second supply voltage is present and in instances in which the second supply voltage is unavailable.

The interface circuit typically includes a first power supply circuit for providing the first input having the first predetermined voltage level, such as 5 volts, in response to the first supply voltage. Additionally, the interface surface includes a regulator for generating an output having the second predetermined voltage level, such as 3.3 volts, in response to the first supply voltage. The interface circuit further includes a second power supply circuit for providing an output that also has the second predetermined voltage level, albeit in response to the second supply voltage. In order to divide the anticipated load between the first and second supply voltages, the interface circuit is designed such that the regulator and the second power supply circuit cooperate to provide the second input having the second predetermined voltage level in instances in which the second supply voltage is present. The interface circuit provides for the universal operation of the computer logic circuit, however, in that the regulator will provide the second input having the second predetermined voltage level in a manner independent of the second power supply circuit in instances in which the second supply voltage is unavailable.

In addition to merely having first and second inputs with first and second predetermined voltage levels, respectively, the second input can be divided into first and second portions that accept different tolerances. As such, the interface circuit may be designed such that the regulator always supplies the first portion of the second input which typically has the tighter tolerance, while the second power supply circuit supplies the second portion of the second input which typically has the looser tolerance, in instances in which the second supply voltage is present. To promote universal operation, however, the regulator can also supply the second portion of the second input in instances in which the second supply voltage is unavailable, albeit generally at a tighter tolerance than required. In order to appropriately provide the first and second portions of the second input at the second predetermined voltage level, the interface circuit preferably includes a power switching circuit for providing the output of the second power supply circuit as the second portion of the second input to the computer logic circuit in instances in which the second supply voltage is present and for providing the output of the regulator as the second portion of the second input to the computer logic circuit in instances in which the second supply voltage is unavailable. Additionally, the interface circuit of this embodiment can include a voltage detection circuit for determining if the second supply voltage is present and for correspondingly notifying the power switching circuit.

The interface circuit and associated method of the present invention therefore provide a computer logic circuit with first and second inputs at first and second predetermined power levels, respectively, while effectively dividing the anticipated load of the computer logic circuit between first and second supply voltages in instances in which both supply voltages are available, thereby decreasing the load that would have been placed upon a single power supply that would have conventionally supplied both inputs to the computer logic circuit. Accordingly, the interface circuit and the associated method substantially reduce the likelihood that the power rating of either power supply will be exceeded, even in instances in which a substantial number of computer logic circuits, such as adapter cards, or plugged into respective adapter or expansion slots. Moreover, the interface circuit and associated method of the present invention provide for the computer logic circuit to be supplied the necessary power in a universal manner such that the computer logic circuit can operate in instances in which only the first supply voltage is provided and in instances in which both the first and second supply voltages are provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
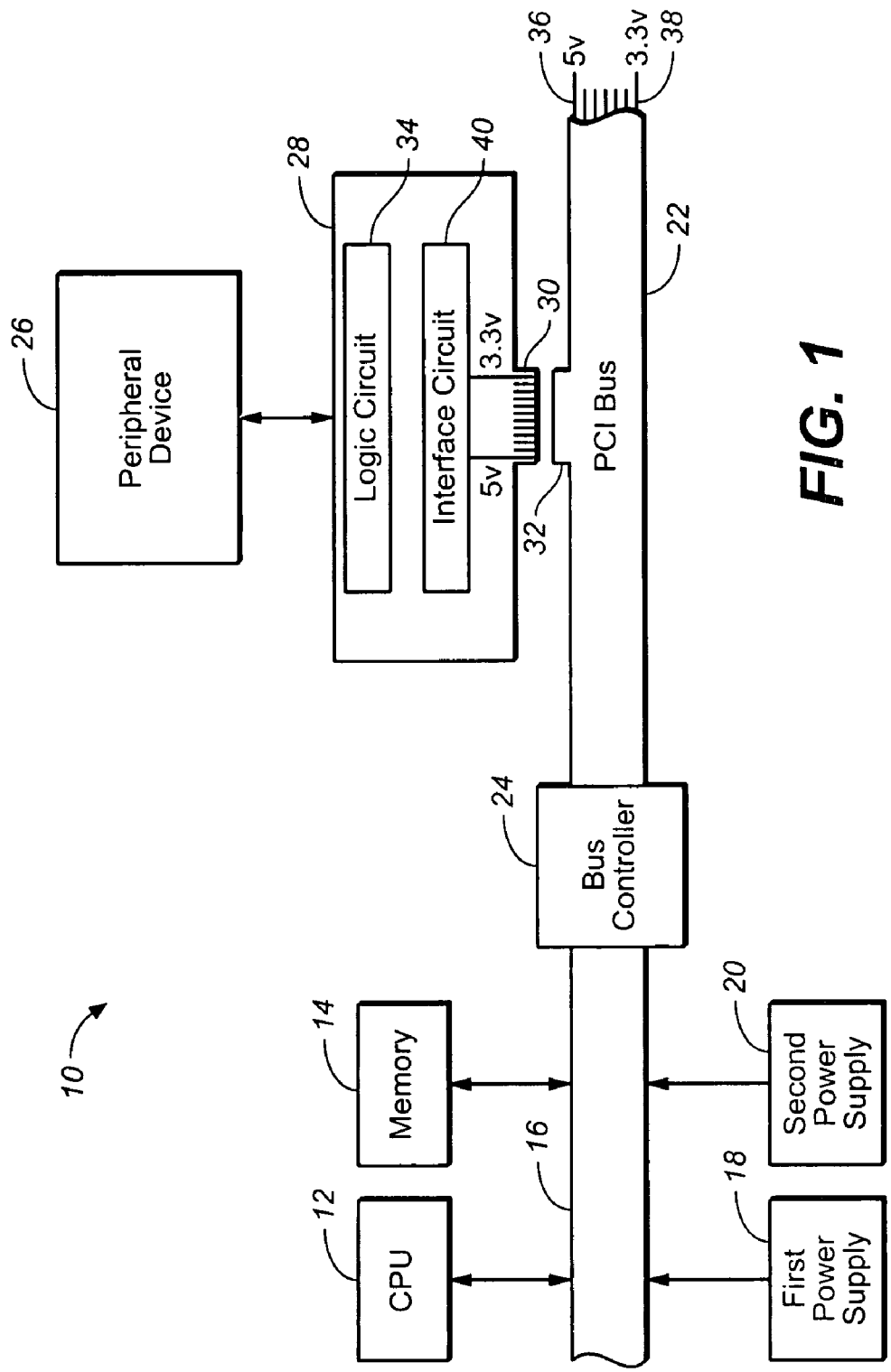
FIG. 1 is a block diagram of computer system which provides both first and second supply voltages to a logic circuit mounted upon an adapter card.

Referring now to FIG. 1, a computer system 10, such as a personal computer, a workstation, a server or the like, is depicted. The computer system includes a central processing unit 12, one or more memory devices 14, such as random access memory (RAM), connected to the central processing unit by a system bus 16. The computer system also includes a first power supply 18, such as a 5 volt power supply, for supplying a first supply voltage, typically via a power rail of the system bus, to the central processing unit and the other components. As will be described below, the computer system may, but need not necessarily, include a second power supply 20, such as a 3.3 volt power supply, for supplying a second supply voltage, typically via another power rail of the system bus, to various components.

While a number of peripheral devices can be plugged into the system bus 16 for communicating with the central processing unit 12 and other components, a computer system 10 typically includes another bus, such as a peripheral component interconnect (PCI) bus 22 that is connected to the system bus, such as by means of a bus controller 24, and is specially designed to communicate with peripheral devices. As such, the interface circuit and associated method of the present invention will be described hereinafter in conjunction with a PCI bus. However, the interface circuit and associated method of the present invention can be employed in conjunction with various other types of buses including the system bus and/or other auxiliary buses without departing from the spirit and scope of the present invention. While a variety of peripheral devices can be connected to a PCI bus, peripheral devices 26, such as displays, hard and/or floppy disk drives, CD-ROM drives, speakers, modems and network controllers that facilitate access to a computer network, are generally installed via respective adapter cards 28.

In order to communicate with the central processing unit 12 and other components via the PCI bus 22, the edge connector 30 of an adapter card 28 associated with a respective peripheral device 26 is typically plugged into an expansion or adapter slot 32 defined by the PCI bus. As known in the art, the adapter card generally includes a logic circuit 34 having a design that varies as necessary to permit the respective peripheral device and the central processing unit to communicate. The expansion slot defined by the PCI bus provides the adapter card with access to the various lines or channels of the PCI bus. In addition to the various address and data lines, a PCI bus generally includes one or more power rails. In this regard, the PCI bus will include a first power rail 36 connected to and powered by the first power supply 18. As such, the first power rail generally provides +5 VDC. In some embodiments, the PCI bus may also include a second power rail 38 connected to and powered by the second power supply 20. As such, the second power rail generally provides a different and generally slightly lower voltage, such as +3.3 VDC.

Figure 2:
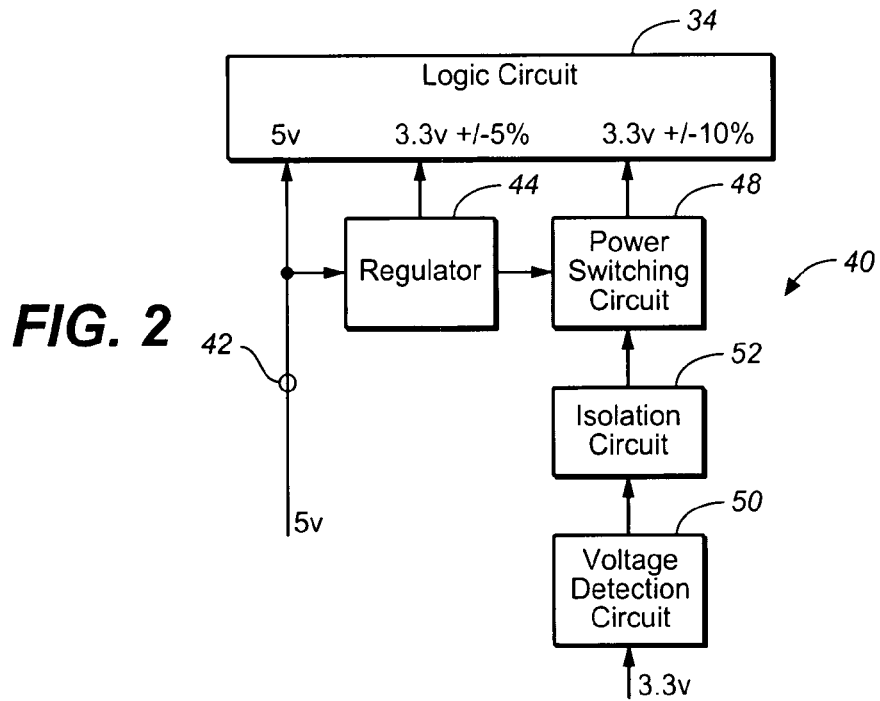
FIG. 2 is a block diagram of an interface circuit according to one embodiment of the present invention.

As illustrated in FIG. 2, an interface circuit 40 is provided according to the present invention that determines the supply voltages that are available for an associated computer logic circuit 34 and that appropriately divides the anticipated load of the computer logic circuit between a pair of supply voltages in instances in which both supply voltages are available. For example, the interface circuit is typically mounted along with the computer logic circuit upon an adapter card 28 that, in turn, is plugged into an expansion or adapter slot 32 defined by a PCI bus 22 so as to communicate with the central processing unit 12 and other components of a computer system 10. As illustrated in FIG. 2, therefore, the interface circuits are connected, typically by means of an edge connector 30, to the first and second power rails 36, 38. The adapter card is also typically connected to a number of other lines of the PCI bus, such as the address and data lines. For sake of clarity, however, the additional connections between the adapter card and the address and data lines of the PCI bus are not depicted in FIG. 2.

The interface circuit 40 includes a first power supply circuit 42 for providing the computer logic circuit 34 with a first input having a first predetermined voltage level based upon the first supply voltage presented by the first power rail 36. For example, the first power supply circuit typically provides the computer logic circuit with a 5 VDC input that is derived from the 5 volt power rail of the PCI bus 22. Although termed a circuit, the first power supply circuit is typically a pin of the edge connector 30 of an adapter card 28 that makes electrical contact with the 5 volt power rail of a PCI bus. However, the first power supply circuit can be more sophisticated, such as by including an isolation circuit for preventing current from flowing from the adapter card to the first power rail, if so desired.

As also depicted in FIG. 2, the interface circuit 40 includes a regulator 44 for generating an output having a second predetermined voltage level in response to the first supply voltage. For example, the regulator can convert a 5 VDC supply voltage provided by the first power rail 36 to 3.3 volts. As known to those skilled in the art, the voltage output by a regulator generally has a relatively small tolerance, such as +/−5%, and is therefore quite accurate.

According to the present invention, the interface circuit 40 also includes a second power supply circuit 46 for providing an output having the second predetermined voltage level in response to the second supply voltage. As such, in instances in which a second supply voltage is provided by the second power rail 38, such as a 3.3 VDC supply voltage, the second power supply circuit will provide an output that has the second predetermined voltage level, such as 3.3 VDC. Typically, however, the output provided by the second power supply circuit has a looser tolerance, such a +/−10%, than the output provided by the regulator 44.

According to the present invention, the regulator 44 and the second power supply circuit 46 are advantageously designed to cooperate to provide the computer logic circuit 34 with a second input having the second predetermined voltage level, such as 3.3 VDC, in instances in which the second supply voltage is present. In instances in which the second supply voltage is unavailable, however, the regulator will provide the logic circuit with the second input having the second predetermined voltage level in a manner independent of the second power supply circuit.

For example, modern digital circuits, including the logic circuits 34 of computer systems 10, generally require both a 5 VDC supply voltage and a 3.3 VDC supply voltage. Additionally, some of the components modern digital circuits require that the 3.3 VDC supply voltage have a relatively tight tolerance, such as +/−5%, while other components of modern digital circuits accept a 3.3 VDC supply voltage with looser tolerances, such as +/−10% or more. For example, local processors and controllers of the computer logic circuits 34 mounted upon adapter cards 28 may require a supply voltage of 3.3 VDC+/−5%, while other components may only require a supply voltage of 3.3 VDC+/−10%.

The regulator 44 of the interface circuit 40 of the present invention is capable of supplying at least that portion of the second input having the tighter tolerances since the regulator is capable of providing 3.3 VDC+/−5%. In contrast, the second power supply circuit 46 is capable of providing that portion of the second input having looser tolerances, such as 3.3 VDC+/−10%. Thus, the regulator and the second power supply circuit cooperate by providing respective portions of the second input in instances in which both the first and second supply voltages are available via the first and second power rails 36, 38, respectively. In instances in which the second supply voltage is unavailable and the second power supply circuit will therefore be incapable of supplying a portion of the second input to the computer logic circuit, the regulator can supply both portions of the second input to the logic circuit.

In this regard, the second power supply circuit 46 can include a power switching circuit 48 for providing the output of the second power supply circuit as the second portion of the second input to the logic circuit 34 in instances in which the second supply voltage is present and for providing the output of the regulator 44 as the second portion of the second input to the computer logic circuit in instances in which the second supply voltage is unavailable. As such, in instances in which the second supply voltage is present, the second power supply circuit of one embodiment provides 3.3 VDC+/−10% to at least some of the components of the computer logic circuit that accept somewhat looser tolerances, while the regulator provides 3.3 VDC+/−5% to the remainder of the components that operate at the 3.3 volt level. In instances in which the second supply voltage is unavailable, however, the regulator will provide the supply voltage, i.e., 3.3 VDC+/−5%, to each component of the computer logic circuit that operates at the 3.3 volt level.

In one embodiment, the second power supply circuit 46 also includes a voltage detection circuit 50 for determining if the second supply voltage is present on the second power rail 38 and for correspondingly notifying the power switching circuit 48. The voltage detection circuit provides a control signal to the power switching circuit such that the power switching circuit configures the second power supply circuit to provide the second portion of the second input to the logic circuit 34 in instances in which the voltage detection circuit determines that a second supply voltage is present, and such that the power switching circuit causes the regulator 44 to provide both the first and second portions of the second input to the logic circuit in instances in which only the first supply voltage is available.

Additionally, the second power supply circuit 46 can include an isolation circuit 52 for permitting the second supply voltage provided by the second power rail 38 to be supplied to the computer logic circuit 34 without permitting the logic circuit to drive or otherwise impose a voltage upon the second power rail, such as in instances in which the second supply voltage otherwise present on the second power rail is reduced. Thus, the isolation circuit only permits current to flow from the second power rail to the computer logic circuit and not in the opposite direction. As will be apparent the isolation circuit is particularly important since the interface circuit is designed to permit the universal application of the logic circuit including instances in which the second power rail is grounded and might draw or sink current from the logic circuit in the absence of the isolation circuit.

Figure 3:
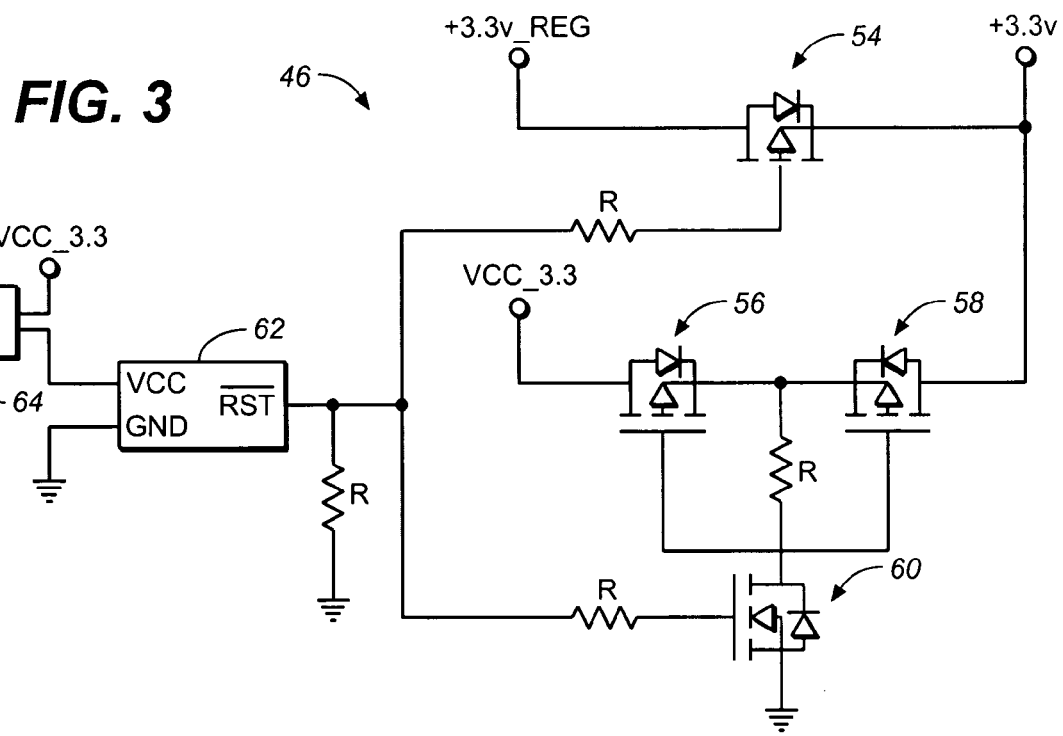
FIG. 3 is an electrical schematic of a portion of an interface circuit according to one embodiment of the present invention.

Referring now to FIG. 3, an electrical schematic of the second power supply circuit 46 of one advantageous embodiment of the present invention is illustrated. As shown, the output (+3.3 V_REG) of the regulator 44 and the second supply voltage (VCC _3.3) provided by the second power rail 38 are provided to the second power supply circuit which, in turn, produces the second portion of the second input of the logic circuit 34 (+3.3 V), i.e., that portion of the 3.3 VDC input that can accept greater tolerances, such as +/−10%.

The second power supply circuit 46 includes a plurality of switches 54, 60 that comprise the power switching circuit 48 and that controllably provide either the output of the second power supply circuit or the output of the regulator 44 as the second portion of the second input (+3.3 V) of the computer logic circuit 34. These switches, typically comprised of transistors and, as illustrated, MOSFETs, are controlled by a control signal having a state dictated by the presence or absence of the second supply voltage upon the second power rail 38. In this regard, the second power supply circuit of the illustrated embodiment includes a logic circuit 62 that serves as the voltage detection circuit 50 and that has an output $\overline{\text{RST}}$ that is high in instances in which the second supply voltage is present on the second power rail and that is low in instances in which the second supply voltage is not present on the second power rail. As indicated in FIG. 3, the voltage detection circuit 50 can also include a jumper 64 such that the interface circuit 40 can be easily disconnected from the second power rail, if desired, merely by pulling or removing the jumper.

The output of the logic circuit 62 is then applied to the switches to control the delivery of the second portion of the second input to the logic circuit 34 from either the second power supply circuit or from the regulator. In instances in which the second supply voltage is available, switches 56 and 58 are turned on or closed and switch 54 is turned off or opened such that the second supply voltage provided by the second power rail is provided as the second portion of the second input to the logic circuit. In contrast, in instances in which the second supply voltage is not present on the second power rail, switches 56 and 58 are turned off or opened and switch 54 is turned on or closed such that the second portion of the second input to the logic circuit is provided by the output of the regulator. Thus, the second power supply circuit controllably supplies the second portion of the second input to the logic circuit based upon the output of the second power supply circuit or the output of the regulator depending upon whether or not the second supply voltage is present on the second power rail 38. The switches 56 and 58 of the illustrated embodiment also serve as the isolation circuit 52 since these switches are opened or turned off in instances in which the second supply voltage is unavailable, thereby preventing the output of the regulator that is provided as the second portion of the second input to the logic circuit from also being imposed upon the second power rail.

Figure 4:
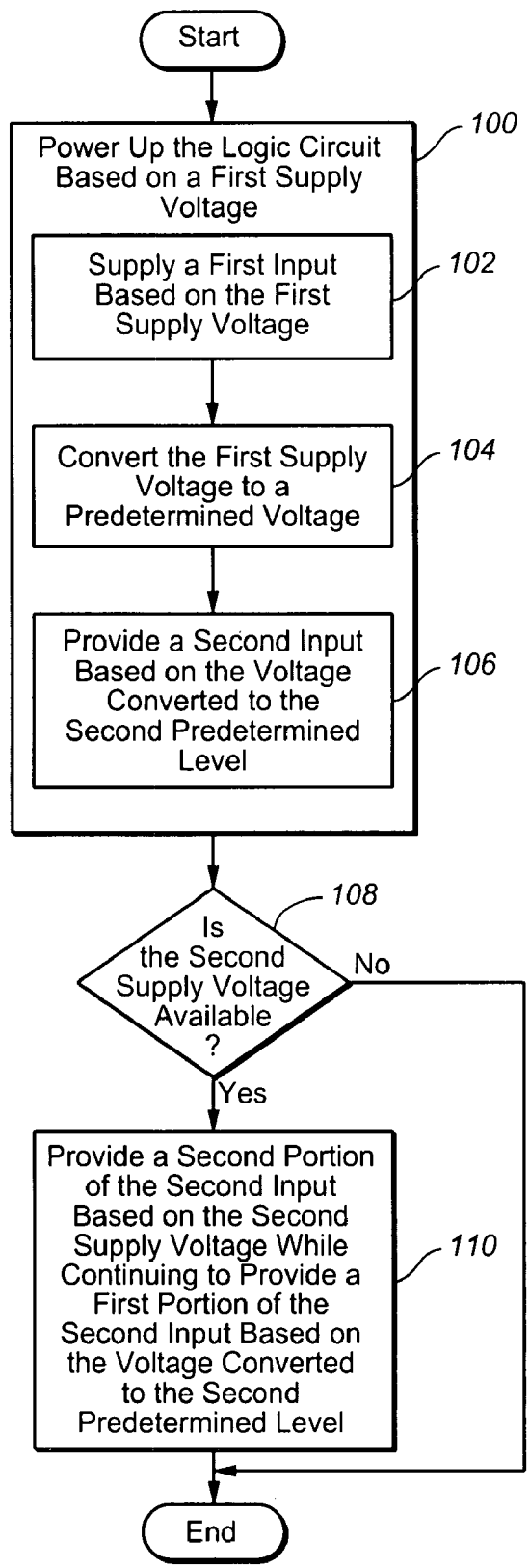
FIG. 4 is a flow chart depicting the operations performed by the interface circuit and associated method of one embodiment of the present invention.

In operation and as depicted in FIG. 4, the computer logic circuit 34 is therefore provided with a first input having a first predetermined voltage level, such as 5 VDC, based upon the first supply voltage, typically provided by the first power rail 36. See block 102. In addition, the first supply voltage is converted to a second predetermined voltage level, such as 3.3 VDC, and is provided as at least the first portion of the second input to the logic circuit. See blocks 104 and 106. Since the first supply voltage will always be provided in instances in which the computer logic circuit is activated, the computer logic circuit will be initially powered up from the first supply voltage. See block 100. Thereafter, the second power supply circuit 46 will determine if the second supply voltage is present. See block 108. If the second supply voltage is available, the second portion of the second input to the logic circuit is provided by the second power supply circuit based upon the second supply voltage. See block 110. Alternatively, in instances in which the second supply voltage is unavailable, the second portion of the second input to the logic circuit is provided in the same manner as the first portion of the second input to the logic circuit, namely, based upon a conversion of the first supply voltage to the second predetermined voltage level. See block 106.

The interface circuit 40 and associated method of the present invention therefore provide a computer logic circuit 34 with first and second inputs at first and second predetermined power levels, respectively, while effectively dividing the anticipated load of the computer logic circuit between first and second supply voltages in instances in which both supply voltages are available, thereby decreasing the load that would have been placed upon any single power supply. Accordingly, the interface circuit and the associated method substantially reduce the likelihood that the power rating of either power supply will be exceeded, even in instances in which a substantial number of computer logic circuits, such as the logic circuits mounted upon adapter cards 28, are plugged into respective adapter or expansion slots 32. Moreover, the interface circuit and associated method of the present invention provide for the computer logic circuit to be supplied the necessary power in a universal manner such that the computer logic circuit can operate in instances in which only the first supply voltage is provided and in instances in which both the first and second supply voltages are provided.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An interface circuit for supplying a computer logic circuit with first and second inputs having respective first and second predetermined voltage levels that are different from each other and from ground, the interface circuit comprising:
    a first power supply circuit for providing the first input having the first predetermined voltage level in response to a first supply voltage;
    a regulator for generating an output having the second predetermined voltage level in response to the first supply voltage; and
    a second power supply circuit for providing an output having the second predetermined voltage level in response to a second supply voltage that is different from the first supply voltage and from ground,
    wherein said regulator and said second power supply circuit cooperate to provide the second input having the second predetermined voltage level in instances in which the second supply voltage is present.

2. An interface circuit according to claim 1 wherein said regulator provides the second input having the second predetermined voltage level in instances in which the second supply voltage is unavailable.

3. An interface circuit according to claim 1 wherein the second input has first and second portions with different tolerances, and wherein said regulator is capable of supplying the first portion of the second input and said second power supply circuit is capable of supplying the second portion of the second input.

4. An interface circuit according to claim 3 wherein said second power supply circuit comprises a power switching circuit for providing the output of said second power supply circuit as the second portion of the second input to the computer logic circuit in instances in which the second supply voltage is present and for providing the output of said regulator as the second portion of the second input to the computer logic circuit in instances in which the second supply voltage is unavailable.

5. An interface circuit according to claim 4 wherein said second power supply circuit further comprises a voltage detection circuit for determining if the second supply voltage is present and for correspondingly notifying said power switching circuit.

6. An interface circuit according to claim 1 wherein said second power supply circuit comprises an isolation circuit for permitting the second supply voltage to be provided to the computer logic circuit without permitting the computer logic circuit to drive the second supply voltage.

7. An interface circuit according to claim 1 wherein the interface circuit and the computer logic circuit are mounted upon an adapter card that is capable of being plugged into an adapter slot to thereby establish electrical contact with at least a first power rail providing the first supply voltage.

8. An interface circuit for supplying a computer logic circuit with an input having first and second portions that are each at the same predetermined voltage level, the interface circuit comprising:
    a regulator for generating an output having the predetermined voltage level in response to a first supply voltage, said regulator providing the output as the first portion of the input to the computer logic circuit; and
    a power supply circuit capable of providing an output having the predetermined voltage level in response to a second supply voltage, wherein said second power supply circuit comprises a power switching circuit for providing the output of said power supply circuit as the second portion of the input to the computer logic circuit in instances in which the second supply voltage is present and for providing the output of said regulator as the second portion of the input to the computer logic circuit in instances in which the second supply voltage is unavailable.

9. An interface circuit according to claim 8 wherein the output provided by said regulator has a smaller tolerance than the output provided by said power supply circuit.

10. An interface circuit according to claim 8 wherein said second power supply circuit further comprises a voltage detection circuit for determining if the second supply voltage is present and for correspondingly notifying said power switching circuit.

11. An interface circuit according to claim 8 wherein said second power supply circuit further comprises an isolation circuit for permitting the second supply voltage to be provided to the computer logic circuit without permitting the computer logic circuit to drive the second supply voltage.

12. An interface circuit according to claim 8 further comprising another power supply circuit for providing the computer logic circuit with an additional input having a different predetermined voltage level in response to the first supply voltage.

13. An interface circuit according to claim 8 wherein the interface circuit and the computer logic circuit are mounted upon an adapter card that is capable of being plugged into an adapter slot to thereby establish electrical contact with at least a first power rail providing the first supply voltage.

* * * * *